US 8,082,569 B2

(12) United States Patent
Brady, Jr. et al.

(10) Patent No.: US 8,082,569 B2
(45) Date of Patent: Dec. 20, 2011

(54) IN-FLIGHT ENTERTAINMENT SYSTEM WITH HAND-OUT PASSENGER TERMINALS

(75) Inventors: Kenneth A. Brady, Jr., Trabuco Canyon, CA (US); Dan Reed, Skyforest, CA (US); Mark Thompson, Rancho Santa Margarita, CA (US); Bradley Foreman, Mission Viejo, CA (US)

(73) Assignee: Thales Avionics, Inc., Irvine, CA (US)

( * ) Notice: Subject to any disclaimer, the term of this patent is extended or adjusted under 35 U.S.C. 154(b) by 601 days.

(21) Appl. No.: 11/267,384

(22) Filed: Nov. 4, 2005

(65) Prior Publication Data

US 2006/0174285 A1 Aug. 3, 2006

Related U.S. Application Data

(60) Provisional application No. 60/625,476, filed on Nov. 5, 2004.

(51) Int. Cl.
*H04N 5/18* (2006.01)
*H04N 5/44* (2011.01)
(52) U.S. Cl. ............... 725/76; 725/74; 725/75; 725/77; 725/78; 348/734
(58) Field of Classification Search .............. 725/74–78, 725/81, 87; 348/734
See application file for complete search history.

(56) References Cited

U.S. PATENT DOCUMENTS

| | | | |
|---|---|---|---|
| 5,610,841 A | 3/1997 | Tanaka et al. | |
| 5,790,787 A * | 8/1998 | Scott et al. | 709/250 |
| 5,835,127 A * | 11/1998 | Booth et al. | 725/76 |
| 5,973,722 A * | 10/1999 | Wakai et al. | 725/76 |
| 6,151,626 A * | 11/2000 | Tims et al. | 725/25 |
| 6,177,887 B1 | 1/2001 | Jerome | |
| 6,249,913 B1 * | 6/2001 | Galipeau et al. | 725/76 |
| 6,577,419 B1 | 6/2003 | Hall et al. | |
| 7,487,938 B2 * | 2/2009 | Brady et al. | 244/118.5 |
| 2002/0178451 A1 * | 11/2002 | Ficco | 725/76 |
| 2003/0233658 A1 | 12/2003 | Keen et al. | |
| 2004/0139467 A1 | 7/2004 | Rogerson et al. | |
| 2004/0261093 A1 * | 12/2004 | Rebaud et al. | 725/25 |
| 2005/0025069 A1 | 2/2005 | Aysan | |

* cited by examiner

*Primary Examiner* — Benny Tieu
*Assistant Examiner* — Sunil Chacko
(74) *Attorney, Agent, or Firm* — Myers Bigel Sibley & Sajovec, P.A.

(57) ABSTRACT

An in-flight entertainment system with hand-out terminals is described. An embodiment of the invention comprises a server having digital content, which is communicatively linked to a communications network, a connector located proximate to each passenger seat of an aircraft, each connector being communicatively linked to the network, and hand-out terminals. Each hand-out terminal is configured to be coupled to one of the connectors to permit a passenger at the seat to which the connector is proximate to access the digital content.

20 Claims, 6 Drawing Sheets

IN-FLIGHT ENTERTAINMENT SYSTEM WITH HAND-OUT PASSENGER TERMINALS

This application claims priority to U.S. Provisional Patent Application Ser. No. 60/625,476 filed on Nov. 5, 2004, which is incorporated herein by reference in its entirety.

FIELD OF THE INVENTION

The invention relates generally to in-flight entertainment systems and, more particularly, to a full in-seat digital video system.

BACKGROUND

Current in-flight entertainment (IFE) systems are tailored to the needs of aircraft that carry more than 150 passengers. Such aircraft have spacious interiors as well as generous weight and power constraints, and the IFE system used therein have seat boxes mounted under the seat, large closets and monuments in which to store head-end equipment, and in-arm passenger control units to control the audio, video and cabin attendant functions. Additionally, current IFE systems consume considerable power. These disadvantages make current IFE systems inappropriate for use in the aircraft of regional jet carriers. One way to minimize these disadvantages is to reduce the level of personalization in IFE systems, such as by forcing individual passengers to share monitors with many other passengers. This, of course, degrades the in-flight experiences for all passengers.

Some IFE systems provide personal video and audio entertainment, either as a permanently installed in-seat video system or as a battery-powered, hand-out video player (DVD or disk based). Permanently installed in-seat video systems force the airline to carry a display for each passenger (independent of use). This means that the aircraft carries the weight of every seat having a display. Also, the installation of in-seat displays requires a significant and expensive modification to the aircraft seats. It is more difficult to manage payment for services if the playing device is always mounted and ready for use. Since the device is always mounted in front of the passenger whether or not it is used, it is subject to more abuse, which increases overall maintenance costs. Hand-out video players have also been made available. Generally, these are hand-out DVD players, and DVDs that can be played in them are available from a library carried onboard the aircraft. The library of DVDs has to be maintained and the players batteries must be either recharged or changed on a periodic basis (often every flight). More recently, audio/video players with embedded hard disk drives provide a much broader range of entertainment, permit the offering of more recent material (often called early release material), but still require battery recharging or changing. In addition, the audio/video players with hard disks must be taken to a loading device to update video and audio content.

The disadvantage of a permanently mounted in-seat video system is expensive installation (seat modification effort and aircraft downtime for installation), higher aircraft weight (causing increased fuel use), and higher equipment costs (one for every seat whether needed or not). One way to minimize this disadvantage is to install in-seat video systems in only a portion of the aircraft. This is often done on a service class basis (first class only, for example). This approach does not help airlines that want to charge for the added feature. If airlines wanted to charge for the service and only some seats were fitted, the cabin crew would have to reseat passengers to provide the service. Moving passengers between seats to provide such a service is simply not practical. It increases the crew load and a strong potential for creating passenger dissatisfaction.

The disadvantage of battery-powered hand-out devices are battery maintenance (charging or changing), content loading (carrying to a content load station), and security of content (the content can be stolen). Onboard charging stations could minimize movement of the portable devices on and off the aircraft but does not address the content loading issues. Also, onboard charging stations increase the weight the aircraft carries on a permanent basis.

SUMMARY

In accordance with the foregoing, a new in-flight entertainment system with hand-out passenger terminals is provided herein. An embodiment of the invention comprises a server having digital content, which is communicatively linked to a communications network, a connector located proximate to each passenger seat of an aircraft, each connector being communicatively linked to the network, and hand-out terminals. Each hand-out terminal is configured to be coupled to one of the connectors to permit a passenger at the seat to which the connector is proximate to access the digital content.

In another embodiment of the invention, a crew cabin member hands out a terminal to an airline passenger, who plugs the terminal into a connector located proximate to the passenger's seat. An in-flight entertainment system on the aircraft recognizes the presence of the terminal. The passenger may use the terminal to request the digital content from the system. The system retrieves the content from an on-demand server, transmits the content to the terminal, which decodes and presents the content to the passenger.

In yet another embodiment, a system for permitting an aircraft passenger to access a digital content on an in-flight entertainment system, is located on-board an aircraft, and includes a server having stored digital content, which is communicatively linked to a computer network. The system further includes video display units, each video display unit being located proximate to a passenger seat, having a connector, and being communicatively linked to the network. Finally, the system also includes hand-out terminals, each hand-out terminal being provided to one of a group of passengers. The terminals may be plugged into the connector of the video display unit proximate to the passenger's seat, and are identifiable to the system. The passengers use the terminal to request the content from the system. In response to the request, the system retrieves the content from the server and transmits the content to the video display unit, which provides the content and electrical power to the hand-out terminal, thereby permitting the passenger possessing the terminal to view or hear the content.

DETAILED DESCRIPTION

Figure 1:
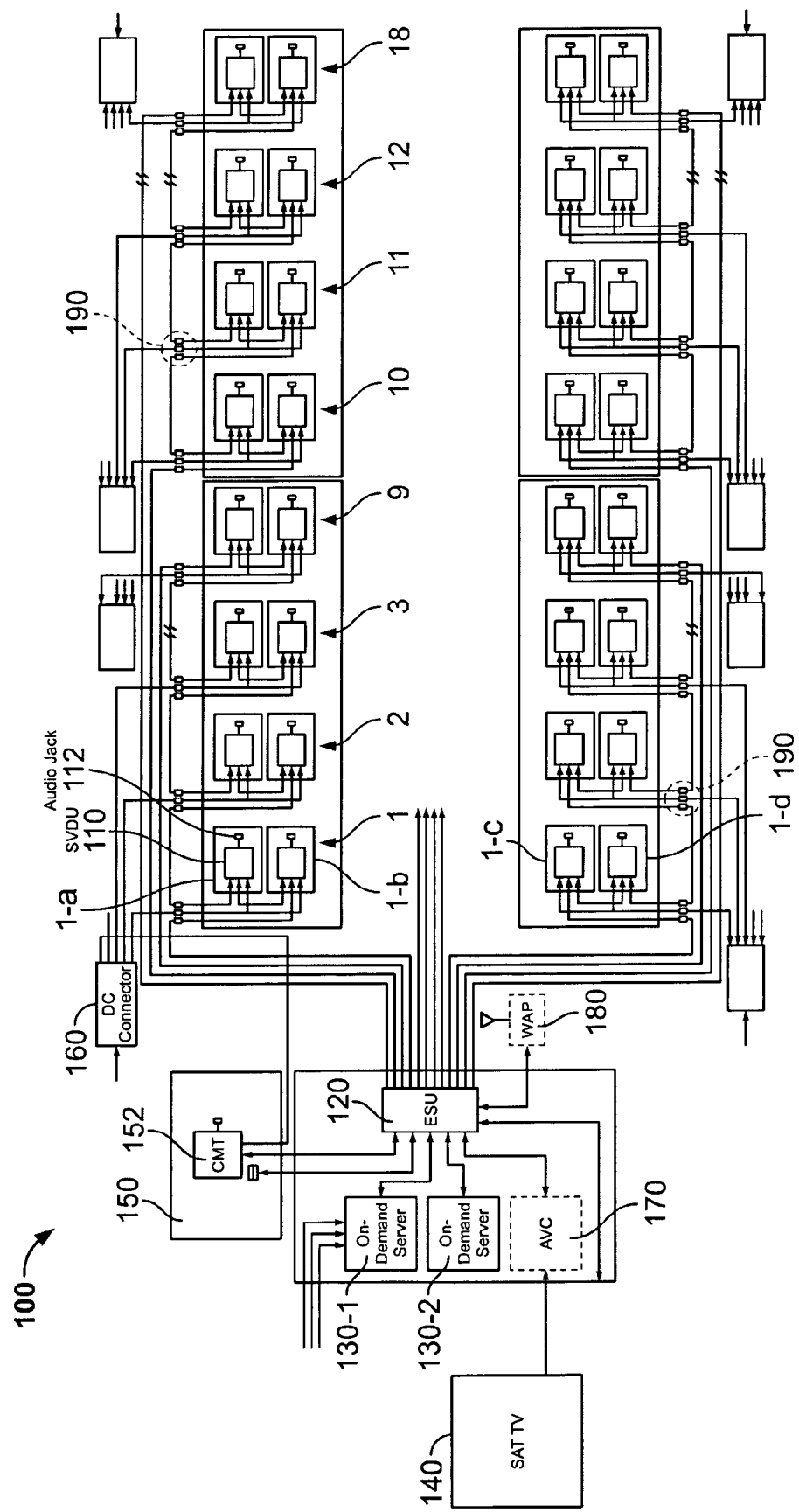
FIG. 1 illustrates the basic topology of an in-flight entertainment system in accordance with one embodiment of the present invention.

An embodiment of the invention is illustrated in FIG. 1. In this embodiment, an IFE system 100 includes a communications network deployed on an aircraft. In this embodiment, the network is Ethernet-based, but may be based on any sort of networking standard. In the illustrated embodiment, the aircraft has several rows, and each row has four seats. Any seating arrangement is possible, however. Each seat has its own smart video display unit (SVDU) 110 having an integrated audio jack (AJ) 112. The SVDUs 110 are communicatively linked to the network. Power to the SVDUs 110 is provided by a number of DC-DC converters 160. The system 100 also includes an Ethernet switch unit (ESU) 120, which appropriately routes Ethernet frames carrying digital content to the SVDUs 110 on the network. The ESU 120 allows various Ethernet devices on the aircraft (e.g., on-demand servers, SVDUs, audio/video controller, SATCOM BGAN port, data loading ports) to communicate with one another. The ESU 120 accepts downloadable configuration tables based on known addresses to support aircraft reconfigurations. There are many possible implementations of the ESU 120. In one embodiment of the invention, for example, the ESU 120 has eight Ethernet ports for 74 seats. In another embodiment, the ESU provides 12 Ethernet ports for 104 seats. It is to be noted that a variety of network topologies are possible for the network, including token ring, and star.

The system 100 also includes a cabin management terminal 152 that is communicatively linked to the network and that permits the flight crew to control and configure aspects of the system. In the illustrated embodiment, the cabin management terminal (CMT) 152 is physically located in a cabin attendant shelter 150 on the aircraft. The system further includes a first on demand server 130-1 and a second on-demand server 130-2, which provide pre-stored digital content to the network. Digital content may also be provided from a variety of other sources including a satellite TV and radio (SAT TV) subsystem 140 that receives real-time TV and radio signals. The SAT TV subsystem 140 is interfaced to the ESU 120 through an audio-video controller (AVC) 170. In the illustrated embodiment, the on-demand servers 130-1 and 130-2 are physically located in a utility cabinet 172.

The hardware components of the IFE system 100 may be physically arranged in any suitable manner. In one embodiment, the ESU 120, on-demand servers 130-1 and 130-2, and the AVC unit 170 are installed in the cargo or electronics bay, including the rack provisions, cooling, and power, with the CMT 150 and dual RJ-45 data loading ports being installed in the main cabin. The CMT 150 may also be located in a forward facing closet, or located in the "hat-rack" or shelf inside the closet area. RJ-45 jacks and DC power jacks may be mounted along the sidewall for each group of seats, thereby providing both a data connection and a power connection for the parts of the IFE system 100 located near that group of seats.

The system may also include at least one wireless access point (WAP) 180 that may, in some situations, be used by passengers with laptop computers or other wireless devices. The WAP 180 provides wireless LAN network connectivity for airborne applications. The WAP 180 is connected to the IFE system 100 via the ESU 120 and allows passenger wireless devices (e.g., laptops) to connect to the on-board cache Web content and entertainment services, as well as off-aircraft connectivity services. The WAP 180 is ARINC 763 (Network Service System) compliant, and is based on the IEEE 802.11b standard. It employs DSSS (Direct Sequence Spread Spectrum) and operates in the 2.4 GHz radio frequency band. Each WAP 180 has a range of at least 300 feet (or at least 100 meters), and transfers data effectively at rates of at least 11 Mbps. Moreover, additional WAPs can be daisy-chained together. Furthermore, some or all of the network of the IFE system 100 may be wireless, using the WAP 180 to access the network.

In the system illustrated in FIG. 1, the data stored on the on-demand servers 130-1 and 130-2 includes digital content such as movies, images, audio recordings, news broadcasts, and music. This content is streamed on-demand from the on-demand servers 130-1 and 130-2, through the ESU 120, and to those SVDUs 110 that request the content. At the each recipient SVDU 110, the content is decoded and processed. Each of the on-demand servers 130-1 and 130-2, in this regard, is capable of providing content simultaneously to multiple (e.g., 75 or more) passengers. Also, more on-demand servers can be included in the system to increase the number of passengers that are simultaneously serviceable. Having multiple (i.e., two or more) on-demand servers also provides redundancy. Thus, in the event that one of the servers experiences a fault and is unavailable to deliver content, or in the event that connectivity between one of the on-demand servers and the network is lost, another on-demand server is able to assume the extra load. For example, assume one of the SVDUs 110 ordinarily receives digital content from the first on-demand server 130-1. If the first on-demand server 130-1 becomes unavailable, the SVDU 110 will stop receiving data from it (e.g., the SVDU 110 transmits a Hypertext Transport Protocol (HTTP) GET command to the first on-demand server 130-1 and receives a "not found" error 404). The SVDU 110 will then request the digital content from the second on-demand server 130-2. After a period of time, the SVDU 110 may check the status of the first on-demand server 130-1 and, it that server has come back up, resume requesting data from it.

In general, the system and method described herein uses a layering approach that combines a large, many port switch at a head-end of a network with a small, localized switch close to the seats. While the actual configuration of the switches is flexible, the basic concept is that each SVDU is connected to one or more head-end servers through a flat, layer 2, Ethernet switch matrix. In this regard, FIG. 1 illustrates an embodiment in which a head-end switch (the ESU 120) feeds columns of seat junction boxes (SJBs) 190 located along the walls of the aircraft. The SJBs can be installed in fixed locations along the aircraft walls. A cable is then run from the SJB to the SVDU 110. This architecture facilitates maintenance activity that requires the seats to be removed by providing a wall disconnect point for the seat electronics.

In an embodiment of the invention, each SVDU 110 can be any suitable monitor for in-seat on-demand content and multicast digital broadcast video and audio viewing in-seat video. The SVDU may include an 8.9" touch screen liquid crystal display (LCD) monitor that features a 16:9 widescreen aspect ratio and is designed to fit in the limited space of a jet seat (e.g., a regional jet Economy Class seat). For example, the SVDUs 110 may be designed to be installed in seat arms, seat backs, consoles, and/or wall mounted. Moreover, the SVDUs can include a decorative shroud. The SVDU 110 may be approximately 2-3 pounds and require approximately 10-15 watts of power. Users may interact with the SVDU via the touch screen monitor.

According to an embodiment of the invention, each SVDU 110 executes a high-speed, high-performance Web browser processor that enables applications and Web menu pages to load. The SVDUs are also capable of providing advanced features, such as displaying video program while simultaneously displaying a Web page or graphic from another source (similar to Picture-in-Picture). The SVDUs have a large amount of memory storage that allows some applications, such as games, to be resident within the SVDU. When a passenger selects a local game to play, all of the loading and interaction is within the SVDU. This not only speeds up the loading of the game, it also ensures that games are available even if there is a failure of the IFE network. Web page technology is used for easy passenger Graphical User Interface (GUI) design and modification. A generic GUI is standard with the IFE system 100, and customizations of all menus and applications may be performed to meet each airline's unique requirements.

Each SVDU 110 can also include: (1) integrated hardware MPEG decoders; (2) local games storage and processing; (3) one or more USB ports for passenger peripherals (such as remote keyboard, game controllers, etc.); (4) a privacy filter; and (5) an integral credit card reader for financial transactions. Additionally, the SVDU may have an external audio jack instead of an integrated audio jack, and may have a separate passenger control device for the passenger to use as a data entry and navigation aid.

Referring still to FIG. 1, the CMT 150 acts as the primary crew interface to the IFE system 100 for control, operation, and maintenance of the IFE system. The CMT 150 executes a computer operating system and has a display with a touch screen that serves as an interface for the cabin attendants and maintenance personnel. It is suitable, in this regard, for the CMT to be implemented using the same device as the SVDU 110 discussed above. The CMT 150 also executes a Web browser client that is used to access control web pages from the IFE system. The CMT 150 provides control and visibility of the IFE system 100 via HTML-based Web pages, including video preview, and maintenance controls such as software upload, configuration management and built-in test equipment. Additionally, because the CMT 150 operates via a Web browser, the crew Graphical User Interface (GUI) may be easily customized to meet the unique requirements of different airlines. The CMT 150 also provides the following functions and controls: (1) power control for the IFE system; (2) manual launch of the safety demo video; (3) initialization of the flight information (flight destination, departure time, arrival time); (4) management of the entertainment system; (5) crew checking of the fault status report; and (6) enable/disable interactive features and airline specific applications.

The CMT 150 receives DC power from the DC power converter 160 and network connectivity via the ESU 120. The front panel of CMT 150 can include a power switch, brightness control, and Universal Serial Bus (USB) ports for carry-on external peripherals (e.g., CD/DVD-ROMs, floppy disc drives, USB thumb drives and keyboards). Crew operation of CMT 150 may also be via a portable USB-type keyboard.

The AVC 170 provides at least 24 channels of encoding of analog video and audio sources such as tape decks, DVD players, and satellite audio and video signals. The AVC 170 encodes in real time the external analog signals and provides MPEG-1 multicast digital streams to the IFE system 100.

The SAT TV 140 may include: an Antenna Control Unit (ACU), a radome assembly, a System Signal Processor (SSP), and a Receiver Decoder Unit (RDU). The ACU is a full range Ku-band antenna operating over the entire Direct Broadcasting Satellite (DBS) range of 10.7 to 12.75 GHz. The ACU provides fully automated acquisition and tracking of the designated satellite. The radome assembly is designed with a blunt aerodynamic approach providing a low drag solution and yielding a negligible impact on fuel burn. The radome passes the full range of DBS frequencies with minimal loss and features a single centerline diverter strip to protect against lightning strikes. Moreover, the radome features blow-out panels for pressurization and incorporates drainage paths to account for water condensation. The SSP processes the aircraft navigation data received from the ARINC 429 interface, and the SSP shares satellite information with the RDU through a RS-485 data bus. The SSP also controls the ACU acquisition through an RS-422 interface. The RDU provides eight channels of DBS signal programming.

Figure 2A:
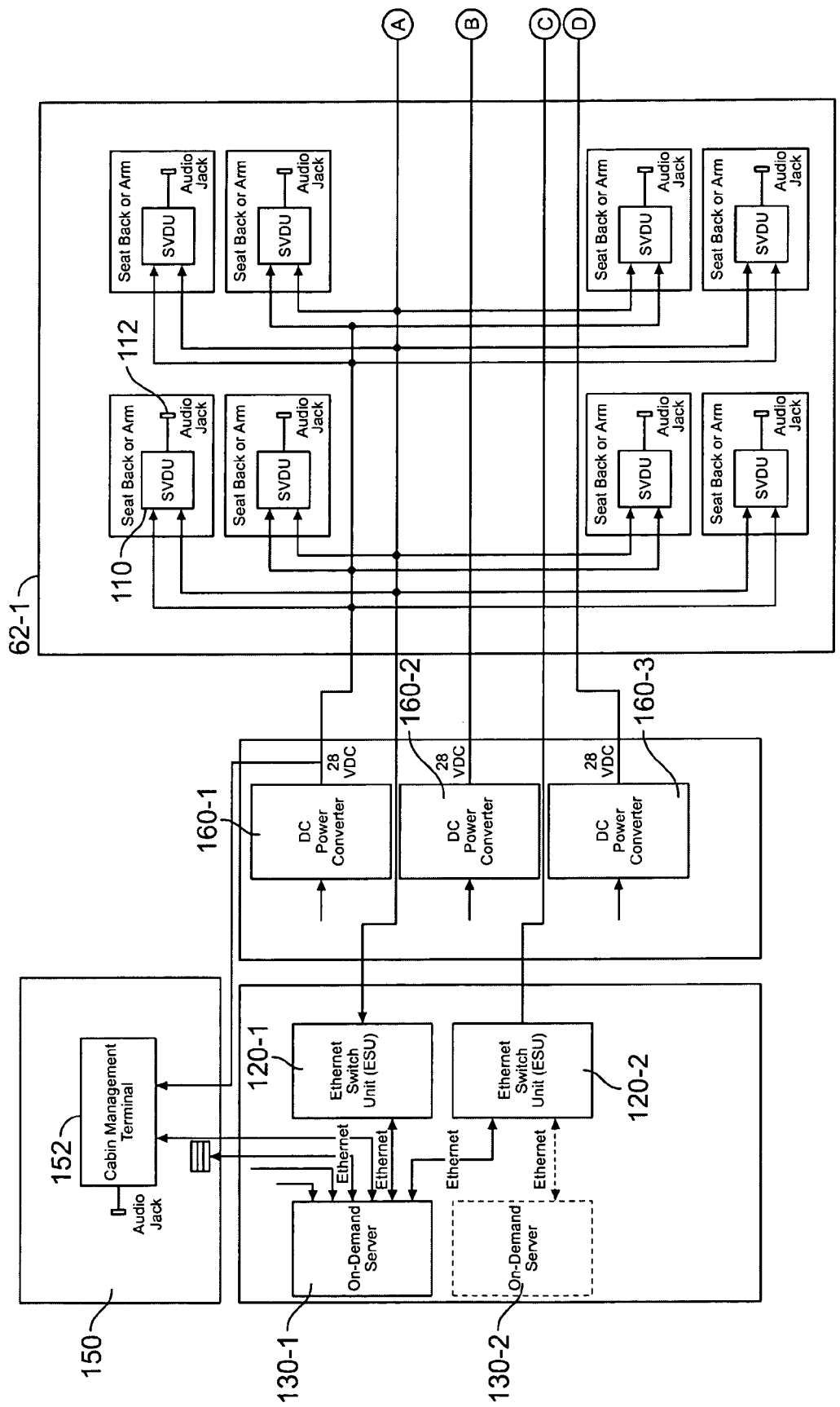
FIGS. 2A, 2B and 3-5 illustrate various other embodiments of the in-flight entertainment (IFE) system.
Figure 2B:
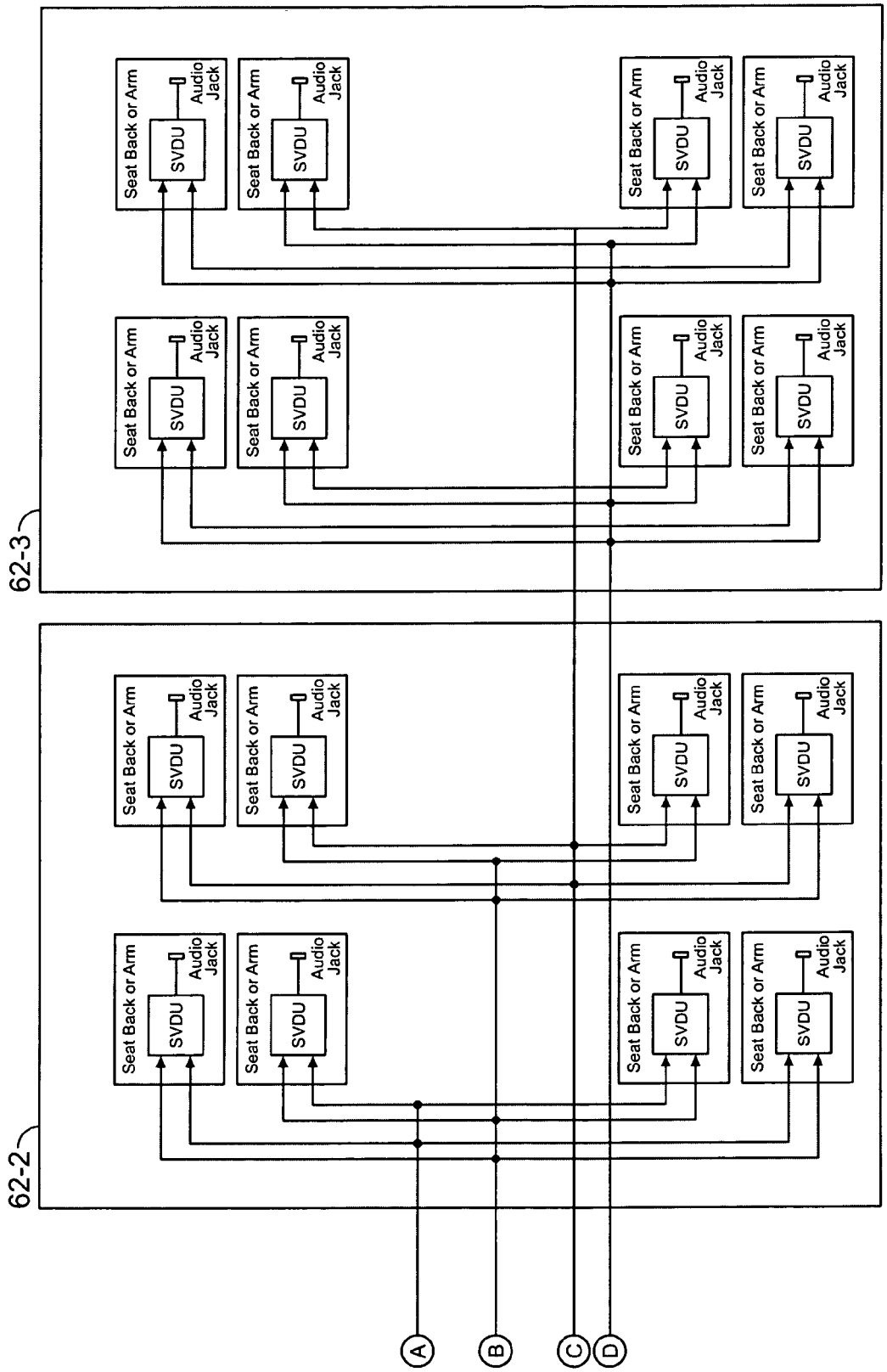

Various features and embodiments of the present invention will now be described with reference to FIGS. 2A and 2B, and FIGS. 3-5. In the embodiment illustrated in FIGS. 2A and 2B, the IFE system is deployed on an aircraft having multiples rows of passenger seats, with four seats per row, with two seats on each side of an aisle. The seats are organized into three groups—a first group 62-1, a second group 62-2, and a third group 62-3. The system also includes many of the components illustrated in, and described in conjunction with FIG. 1. These components will be referred to using the same primary reference numbers used in FIG. 1, although secondary reference numbers are appended to indicate multiple instances of each component. The functionality of like-numbered components is assumed to be the same. In the embodiment of FIGS. 2A and 2B, a first, a second and a third DC Power Converter 160-1, 160-2, and 160-3, are each arranged as a power bus along the wall of the aircraft, such that one power converter serves each of the first, second and third groups 62-1, 62-2, and 62-3 of seats. The system also includes a first ESU 120-1 and a second ESU 120-2. Each of the ESUs has the same basic functionality as the ESU 120 described in conjunction with FIG. 1. In one embodiment, each ESU 120 has 48 ports, has auto-detect capability, and supports 10/100 Base-T Ethernet. In the embodiment of FIGS. 2A and 2B, having a second ESU provides redundancy in the event that one of the ESUs goes down or loses connectivity. In the embodiment of FIGS. 2A and 2B, the first group 62-1 of seats is wired to the first power converter 160-1, the second group 62-2 of seats is wired to the second power converter 160-2, and the third group 62-3 of seats is wired to the third power converter 160-3. Furthermore, the first group 62-1 of seats and half of the second group 62-2 of seats are linked via Ethernet cable to the first ESU 160-1. The third group 62-3 of seats, as well as the other half of the second group 62-2 of seats is linked via Ethernet cable to the second ESU 160-2.

Figure 3:
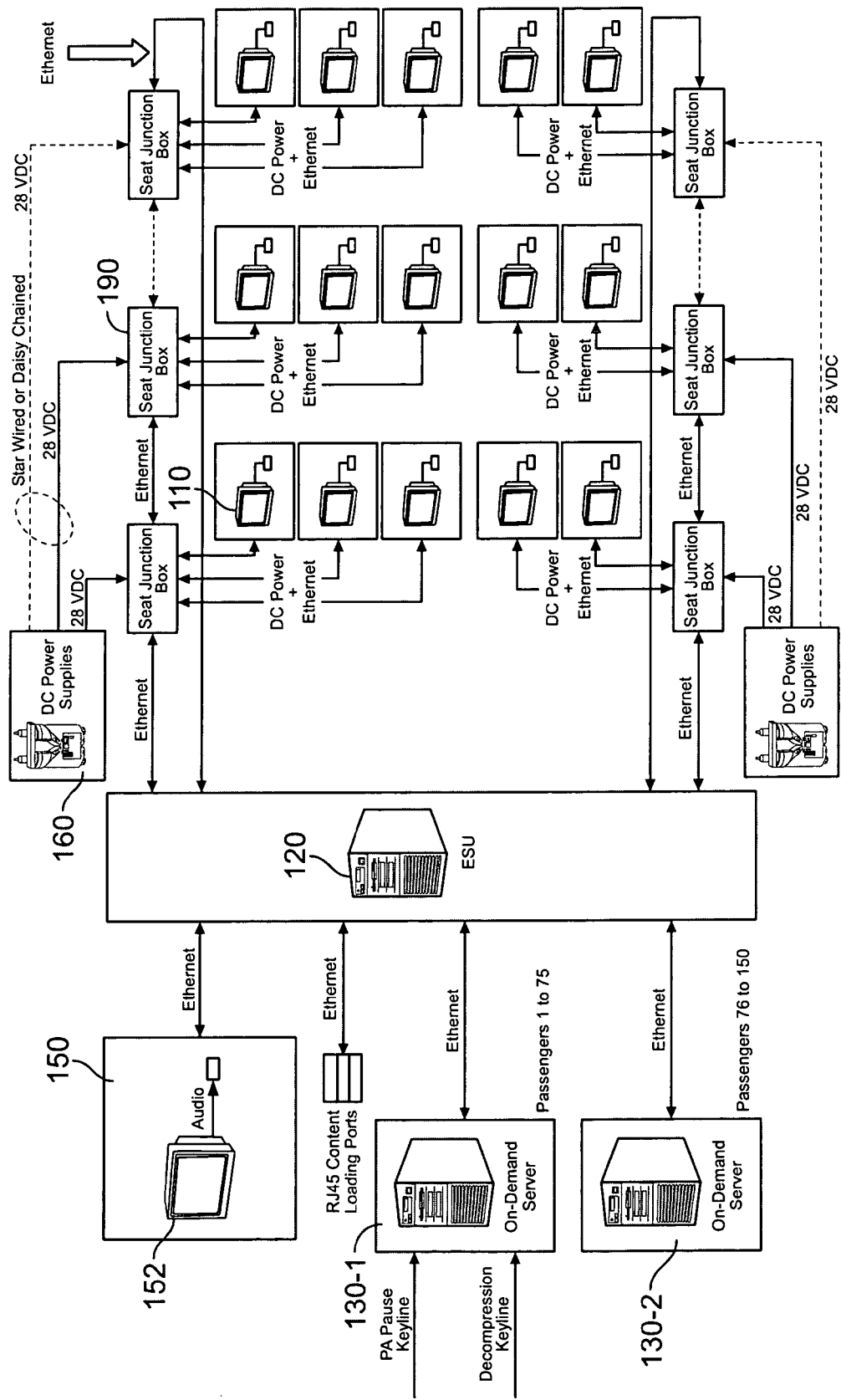

Referring to FIG. 3, in an embodiment of the invention, the IFE system includes seat junction boxes 190 distributed throughout the aircraft. Each seat junction box 190 provides data and power to nearby SVDUs 110. In particular, the DC Power Converters 160 supply power to seat junction boxes 190, which, in turn, supply power to SVDUs 110. Similarly, the ESU 120 is communicatively linked via Ethernet cable to each of the seat junction boxes 190. The seat junction boxes are, in turn, communicatively linked via Ethernet cable to the individual SVDUs 110.

Figure 4:
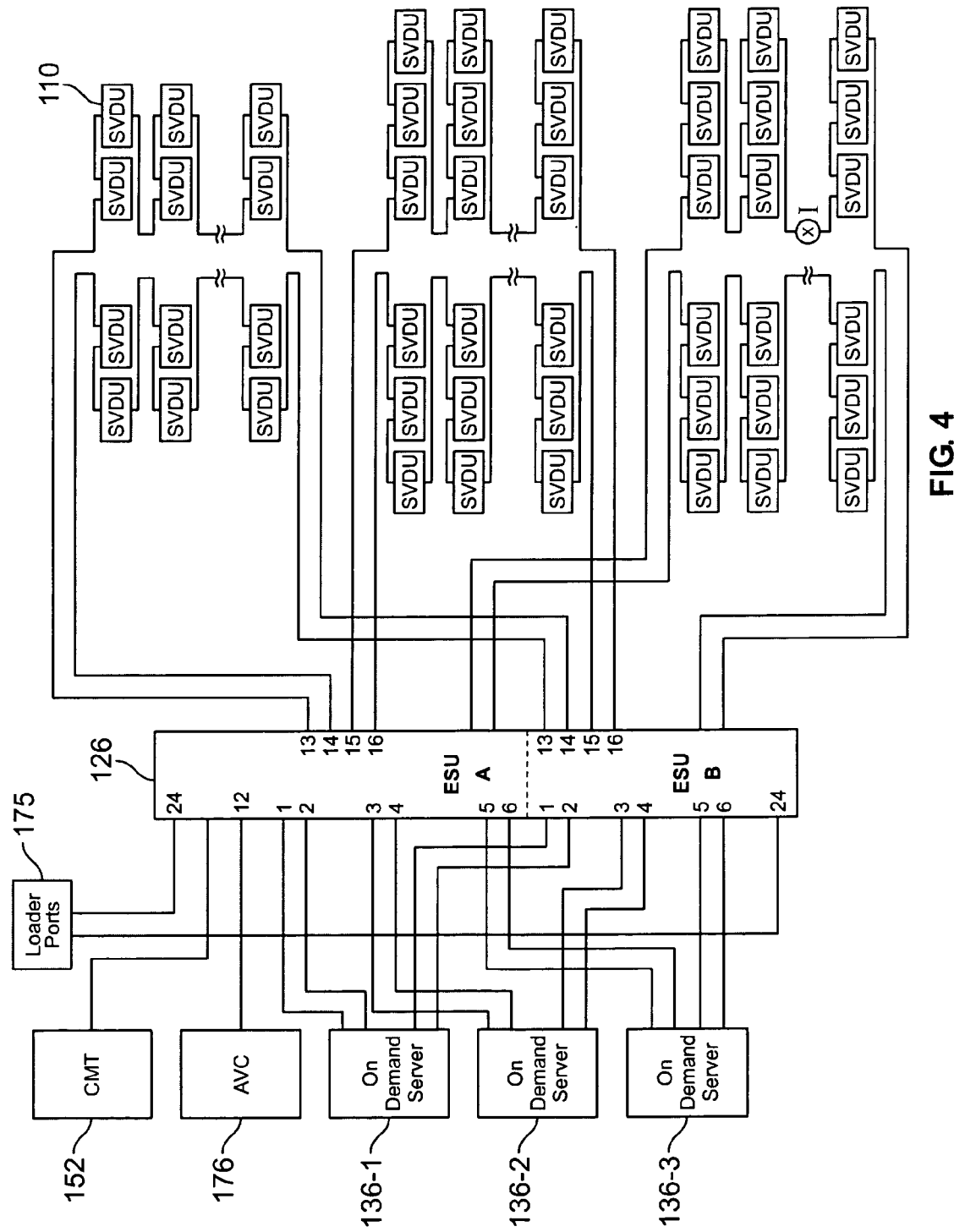

Referring to FIG. 4, another embodiment of the invention will now be described. In this embodiment, the IFE system has many of the same components as the previously described embodiments, as indicated by similar labels and reference numbers. In the embodiment of FIG. 4, the IFE system includes a first on-demand server 130-1, a second on-demand server 130-2, and a third on-demand server 130-3. The ESU 120 includes two complete and independent 24-port managed Ethernet switches, labeled A and B respectively. In the embodiment of FIG. 4, the duplication of on-demand servers and Ethernet switches provides for data redundancy. Thus, for example, if the first on-demand server 130-1 becomes disabled, then the ESU 120 can automatically reroute the on-demand video requests that were originally intended for the first on-demand server 130-1 to the second on-demand server 130-2. Thus, the SVDUs 110 that were being served by the first on-demand server 130-1 will now be served by the second on-demand server 130-2. Similarly, if one of the Ethernet switches in the ESU 120 becomes disabled, then the on-demand server or servers that relied upon that Ethernet switch can send all of their data traffic to the other Ethernet switch. For example, the Ethernet switch A normally routes the Ethernet frames of the first on-demand server 130-1, but becomes disabled, then the first on-demand server 130-1 will send its Ethernet frames to switch B. Switch A and switch B may maintain duplicate copies of each others routing tables for this purpose.

Referring still to FIG. 4, the SVDUs 110 are daisy-chained together via Ethernet cables. This configuration provides yet another data redundancy feature. For example, if there is a break in the Ethernet connectivity at point I in FIG. 4, all of the SVDUs on either side of the break will still be connected to the network by receiving data traffic from the opposite side. This aspect of the invention will be described further with reference to FIG. 5.

Figure 5:
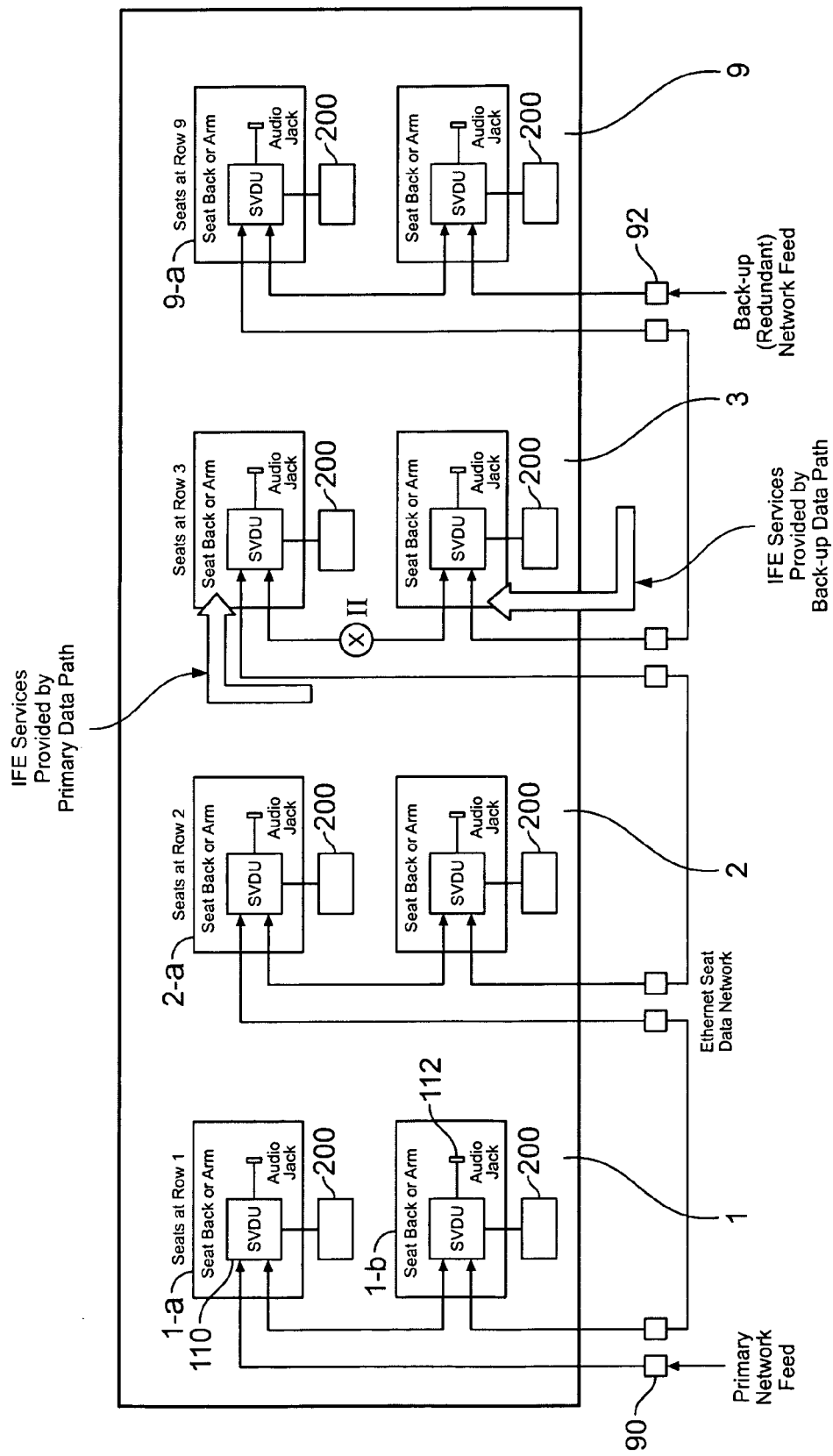

Referring to FIG. 5, yet another embodiment of the invention will now be described. In this embodiment, redundant network architecture is provided by running two or more Ethernet lines (each originating from a different physical port) from the ESU to each column of seats. In this embodiment, the first Ethernet line will be referred to as the primary network feed, and feeds the first seat group of that column at a Primary Network Feed Site 90, which then feeds in a daisy-chain manner to the remaining seats in that column. The second Ethernet line will be referred to as the back-up or redundant network feed, and runs from the ESU to the last seat group of that same column at a Back-Up (Redundant) Network Feed Site 92. If, for example, a problem or break occurs at Site II, then the SVDUs will seek an alternate connection via the second Ethernet link to the servers. So, in this example, the SVDU in one of the seats in Row 3 and the SVDUs in the seats in Row 9 will receive data from the back-up network feed.

Referring still to FIG. 5, the IFE system can also include hand-out terminals 200. The hand-out terminals are integrated (in terms of their functionality) with the SVDUs 110, and can be connected thereto. All SVDUs may have the port to allow the hand-out terminals to be connected, but only those passengers provided with the hand-out passenger terminal can connect to and use the system. Although the connection between the SVDU and the hand-out terminal may be standard, such USB 2.0, the SVDU will only recognize and use the specific hand-out terminals provided with the system. By connected the hand-out terminal to the SVDU, the passenger may gain access to the on-demand servers, and thus to a large library (e.g., potentially more than 500 hours of audio and video material) of entertainment material. The hand-held unit 200 is powered over the cable connector thereby eliminating any need for batteries and their maintenance. Since the hand-out terminal has no storage for content, there is no concern (or airline liability) for content loss. Airlines will easily obtain permission to present early-release movies as the potential for carry-off theft is eliminated. Hand-out passenger terminals 200 can also include: a 100 BT Connection Plug, Audio on Demand (AOD) MP-3 player, Video on Demand (VOD) MPEG 1,2 player; Web Access functionality; Games; Anti-Theft Device; Keyboard; Mouse; and/or Credit Card Reader.

In an embodiment of the invention, the IFE system is able to load flight information automatically according to the flight phase. In particular, for example, flight information can be input via the ARINC 429 interface connections to the flight guidance computer and the air data computer. Moreover, content can be scripted and automatically broadcasted from the server to the IFE system. In this regard, many different scripts can be stored on the aircraft and triggered by various parameters such as flight phase and routing. This allows route specific programming with little or no flight attendant intervention. Scripting can be provided to manage the in-seat IFE access as needed. The cabin crew has the possibility to override the automated functionality via the CMT 150. Furthermore, the IFE system includes loader ports 175 (FIG. 5) through which entertainment content and switching tables may be loaded into the system.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A system for providing in-flight entertainment, the system comprising:
 a server disposed within an aircraft, the server having stored thereon digital content;
 a communications network disposed within the aircraft, wherein the server is communicatively linked to the network;
 a plurality of connectors, each connector being located proximate to a passenger seat of a plurality of passenger seats on the aircraft, and each connector being communicatively linked to a smart video display unit (SVDU) in the network; and
 a plurality of hand-out terminals specific to the system, such that the system prohibits access to the system via any of the plurality of connectors without the use of a said hand-out terminal, and each said hand-out terminal is configured to couple to a connector of the plurality of connectors to become functionally integrated with said SVDU such that the SVDU recognizes said hand-out terminal coupled to the connector and authorizes the hand-out terminal to access the server so that a passenger at the seat to which the connector is proximate can access the digital content via said hand-out terminal, and causes the digital content to be transmitted through the network to the hand-out terminal and/or SVDU.

2. The system of claim 1, wherein the communications network is an Ethernet network in which Ethernet frames containing the digital content are transmitted to the hand-out terminal at the passenger's seat.

3. The system of claim 1, wherein the digital content is transmitted to the hand-out terminal as streaming video, and wherein the hand-out terminal comprises a decoder for decoding the streaming video.

4. The system of claim 1, wherein the digital content is transmitted to the hand-out terminal as streaming audio, and wherein the hand-out terminal comprises a decoder for decoding the streaming audio.

5. The system of claim 1, wherein the digital content stored on the server comprises in-flight movies.

6. The system of claim 1, wherein the digital content is a video game, and wherein the hand-out terminal permits the passenger to play the video game.

7. The system of claim 1, wherein the connector is a Universal Serial Bus connector.

8. The system of claim 1, wherein in the network determines whether or not the terminal is one that belongs to the system and, based on the determining step, permits the digital content to be transmitted to the terminal.

9. The system of claim 1, further comprising a network switch communicatively linked to the server and to the hand-out terminal.

10. A method for permitting a passenger to access a digital content on an in-flight entertainment system, the system being located on-board an aircraft, the method comprising:
a crew cabin member handing out a terminal, specific to the system, to the passenger;
the passenger plugging the terminal into a connector that is located proximate to the passenger's seat and is communicatively linked to a smart video display unit (SVDU) in the system;
the SVDU prohibiting access to the system via the connector without the use of the terminal, and recognizing the presence of the terminal and authorizing access of the server via the terminal when the terminal is plugged into the connector and becomes functionally integrated with the SVDU;
the passenger using the terminal to request the digital content from the system;
the system retrieving the content from an on-demand server;
the system transmitting the digital content to the terminal;
the terminal decoding the digital content; and
the terminal presenting the digital content to the passenger, and causing the digital content to be transmitted through the network to the hand-out terminal and/or SVDU.

11. The method of claim 10, wherein the system transmits the digital content over an Ethernet network in which Ethernet frames containing the digital content are received by the terminal at the passenger's seat.

12. The method of claim 10, wherein the system transmits the digital content to the terminal as streaming video, and wherein the terminal comprises a decoder for decoding the streaming video.

13. The method of claim 10, wherein the system transmits the digital content to the terminal as streaming audio, and wherein the terminal comprises a decoder for decoding the streaming audio.

14. The method of claim 10, wherein the digital content comprises in-flight movies.

15. The method of claim 10, wherein the digital content is a video game, wherein the terminal permits the passenger to play the video game.

16. A system for permitting a passenger to access a digital content on an in-flight entertainment system, the system being located on-board an aircraft, the system comprising:
a server having stored therein digital content;
a computer network, the server being communicatively linked to the computer network;
a plurality of smart video display units, each smart video display unit being located proximate to a passenger seat, each smart video display unit comprising a connector, and each smart video display unit being communicatively linked to the network; and
a plurality of hand-out terminals, each hand-out terminal being provided to one of a plurality of passengers for being plugged in to the connector of the smart video display unit proximate to the passenger's seat to become functionally integrated with the smart video display unit, each hand-out terminal being specific to and identifiable by the smart video display unit whose connector into which the hand-out terminal is plugged, such that the smart video display unit prohibits access to the system via the connector of the smart video display unit without the use of a said hand-out terminal,
wherein the passenger uses the terminal to request the content from the system,
wherein, in response to the request, the smart video display unit authorizes the terminal to access the server so that the system retrieves the content requested by the passenger using the terminal from the server and transmits the requested content to the smart video display unit,
and wherein the smart video display unit provides the requested content and electrical power to the hand-out terminal, thereby permitting the passenger possessing the terminal to view or hear the content, and cause the digital content to be transmitted through the network to the hand-out terminal and/or SVDU.

17. The system of claim 16, wherein the communications network is an Ethernet network in which Ethernet frames containing the digital content are transmitted to the video display unit at the passenger's seat.

18. The system of claim 16, wherein the digital content is transmitted as streaming video, wherein the hand-out terminal comprises a decoder for decoding the streaming video.

19. The system of claim 16, wherein the digital content is transmitted as streaming audio, wherein the hand-out terminal comprises a decoder for decoding the streaming audio.

20. The system of claim 16, wherein the digital content is a video game, wherein terminal permits the passenger to play the video game.

* * * * *